United States Patent [19]
Critzer

[11] Patent Number: 5,533,589
[45] Date of Patent: Jul. 9, 1996

[54] SIGNAL RESPONSIVE VEHICLE DISABLING SYSTEM

[75] Inventor: W. Larry Critzer, Jacksonville, Fla.

[73] Assignees: Rick P. Lucas; Allan D. Terry, both of Jacksonville, Fla.

[21] Appl. No.: 419,025

[22] Filed: Apr. 10, 1995

[51] Int. Cl.⁶ .................................................. B60R 25/00
[52] U.S. Cl. ........................................ 180/287; 307/10.2
[58] Field of Search ................................. 180/167, 287; 307/10.2, 10.3, 10.4; 340/426

[56] References Cited

U.S. PATENT DOCUMENTS

| | | | |
|---|---|---|---|
| 3,559,757 | 2/1971 | Weiss | 180/287 |
| 3,580,353 | 5/1971 | Thompson | 180/167 |
| 3,947,693 | 3/1976 | Eskenas | 307/10.4 |
| 4,449,605 | 5/1984 | Read | 180/287 |
| 4,660,528 | 4/1987 | Buck | 180/167 |
| 4,852,680 | 8/1989 | Brown et al. | 180/287 |
| 5,276,728 | 1/1994 | Pagliaroli et al. | 180/287 |
| 5,345,902 | 9/1994 | Kalail et al. | 123/198 B |
| 5,370,201 | 12/1994 | Inubushi | 180/287 |
| 5,408,211 | 4/1995 | Hall | 307/10.2 |
| 5,448,218 | 9/1995 | Espinosa | 180/287 |

Primary Examiner—Paul N. Dickson
Attorney, Agent, or Firm—Thomas C. Saitta

[57] ABSTRACT

A remote signal responsive vehicle disabling system comprising a receiver, a disabling mechanism with external leads for direct connection to a fuse receptacle of an operative electrical circuit in the vehicle, where the disabling mechanism comprises a destructible component which is destroyed upon activation, thereby interrupting the operative electrical circuit of the vehicle and disabling it.

15 Claims, 1 Drawing Sheet

SIGNAL RESPONSIVE VEHICLE DISABLING SYSTEM

BACKGROUND OF THE INVENTION

This invention relates generally to the field of vehicle disabling systems responsive to remote radio transmission signals for the purpose of preventing unauthorized operation of the vehicle in the event of a theft or carjacking. More particularly, the invention relates to such systems which utilize a radio receiver to activate means to interrupt a required operative system of the vehicle. Even more particularly, the invention relates to such systems which interrupt a required electrical circuit and are adapted to connect to said circuit through the standard fuse box.

Remotely controlled vehicle disabling systems are known in the art. For example, Thompson in U.S. Pat. No. 3,580,353 teaches a fuel line shunting device which is mechanically incorporated into the fuel line of a vehicle. In response to a remote radio signal, the fuel line is blocked and the fuel is diverted to a dump line. Buck in U.S. Pat. No. 4,660,528 teaches a system where the disabling signal is a code related to the vehicle license plate. U.S. Pat. No. 5,276,728 to Pagliaroli et al. shows a complicated system incorporating an outgoing theft signal from the vehicle with the disabling circuitry connected to multiple circuitry within the vehicle. U.S. Pat. No. 5,345,902 to Kalail, St. et al. shows a complicated system requiring a microprocessor and disabling or enabling the vehicle based on clock time. Inubushi in U.S. Pat. No. 5,370,201 teaches a system utilizing two cellular phones, with the disabling circuitry connected to the cellular phone in the vehicle.

The known systems for remote disabling of a vehicle by reception of a radio transmission are typically overly complicated and require special installation in the vehicle. Some require that they be activated each time the vehicle is used. This has a direct effect on consumer acceptance and use, as the high cost of a complicated system, the cost of installation, the necessity for delivery of the vehicle to experts for installation and the necessity to arm the system every time it is to be utilized will negatively impact the consumer's perception of the value of the product. There is a need therefore for a remote vehicle disabling system which is effective, yet remains low cost and can be installed by the consumer as an after-market product. Additionally, many of the known systems disable the vehicle for only short periods of time, or can be reactivated by knowledgeable thieves, which defeats the goal of rapid recovery of the vehicle.

It is an object of the invention to provide a vehicle disabling system which is activated by radio wave transmission, such that the owner can activate the disabling system by remote means as simple as placing a telephone call, where the activation requires a password or personal identification number in addition to the standard seven digit telephone number to prevent accidental disabling of the vehicle by wrong numbers. It is a further object to provide such a system where the system is self-contained and can be easily installed by the consumer by connection to the standard fuse box of the vehicle. It is a still further object to provide such a system where the system is of relatively low cost and simple in operation. It is a still further object to provide such a system where the consumer can choose or vary the particular vehicle operative system interrupted, such that it will not be readily apparent to the car thief that a disabling device is in operation. It is a still further object to provide as part of the system a disabling mechanism containing a component which must be replaced in order to operate the vehicle after it has been disabled, and to construct the disabling mechanism such that replacement of the component without resetting the system will result in the vehicle being disabled again shortly thereafter replacement.

SUMMARY OF THE INVENTION

The invention is a system for disabling operation of a motor vehicle by remote radio signal transmission to prevent unauthorized operation of the vehicle, and is especially suited for incidents of vehicle theft or carjacking. Upon the owner becoming aware of the loss of his or her vehicle, the owner dials the assigned disabling number on a standard, portable or cellular telephone, the disabling number being of the type assigned to a portable or cellular telephone or pager, such that the signal is ultimately transmitted over radio frequencies to the vehicle. An additional password or personal identification number must be entered in addition to the standard seven digit phone number to prevent activation by accident. A receiver of the type found in standard portable or cellular telephones or pagers receives the transmitted activation signal and password and initiates the disabling mechanism. The disabling mechanism is a self-contained device and can be of any simple construction which interrupts the flow of an electrical circuit, providing that a component of the disabling mechanism is destroyed or rendered inoperable and non-repairable by activation of the system, such that the component must be replaced to operate the vehicle. The disabling mechanism comprises a housing containing the disabling circuitry with external leads ending in a plug or connector device adapted to fit into a standard fuse receptacle in the standard fuse box of the vehicle. In this manner the disabling system can be installed in a vehicle by the consumer without need for special installation, and the system can be installed to deactivate any of the essential vehicle operative systems, such as the fuel system, the ignition system, the lights, etc., at the option of the consumer. The disabling mechanism can comprise, for example, a circuit containing a battery power source, a transistor or 1.5 volt relay, a 12 volt relay and a fuse, whereby the activation signal produces a current of sufficient magnitude to blow the fuse and interrupt the particular electrical vehicle operative circuit to which the external leads have been connected. Without replacement of the fuse, the electrical circuit will not function and the vehicle cannot be operated. In the preferred embodiment, the disabling mechanism is reactivated periodically every few minutes, such that if the blown fuse is replaced by the thief, the replaced fuse will itself be blown and the vehicle again disabled, unless a reset mechanism has been initiated at the time of replacement of the fuse.

DETAILED DESCRIPTION OF THE INVENTION

Figure 1:
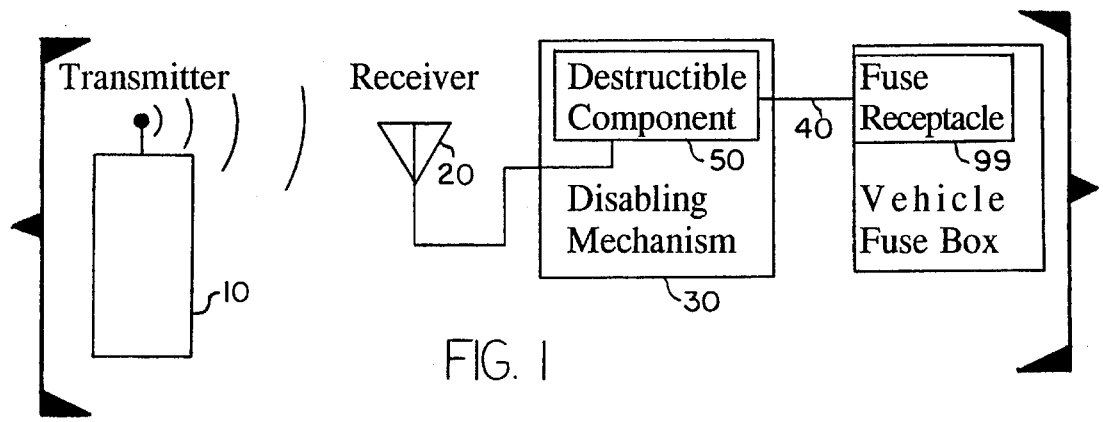
FIG. 1 is a block diagram illustrating the general components of the remote signal responsive vehicle disabling system.
Figure 2:
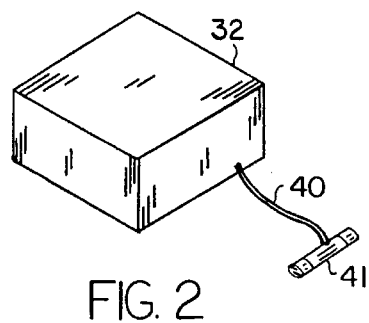
FIG. 2 is a view of the housing and external leads.
Figure 3:
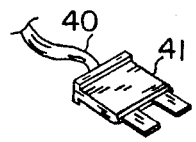
FIG. 3 is a view of an alternative embodiment for the connector for the external leads.

With reference to the drawings, the preferred embodiment and best mode of the invention will now be disclosed in detail. As shown in general in the block diagram of FIG. 1, the invention is a signal responsive vehicle disabling system comprising a separate transmitter means 10 to transmit an activation signal, a receiver means 20 mounted into a vehicle, a disabling mechanism means 30 and external leads 40. The receiver means 20, disabling mechanism means 30 and external leads 40 are all connected in an electrical circuit, and the external leads 40 are adapted to be inserted into a standard fuse receptacle 99 in the fuse box of the vehicle, such that the electrical circuit of the invention becomes part of one of the electrical circuits of the vehicle. For example, most vehicles use electrical fuel pumps to supply fuel to the engine, and the electrical fuel pump circuit is routed through the fuse box such that any current surge above a predetermined maximum amperage will blow the fuse inserted in the fuse receptacle 99. To utilize the invention, the standard fuse is removed from the fuse receptacle 99 and the external leads 40, which end in a connector fitting 41 adapted to mount directly into the fuse receptacle as shown in FIG. 2 or 3, are inserted in its place. The electrical circuit controlling the fuel pump is now routed through the disabling mechanism means 30, which operates normally unless the vehicle disabling system is activated.

The connector plug or fitting 41 is constructed to fit either type of commonly found fuse receptacle 99. For example, as shown in FIG. 2, the connector fitting 41 is similarly configured to a blade type fuse, while in FIG. 3 the connector fitting 41 is similarly configured to match a bulb type fuse. Installation of the system into a vehicle is extremely simple and can be accomplished readily by the consumer, allowing the system to b sold and installed as an after-market item. Additionally, the vehicle disabling system can be connected to any electrical circuit within the vehicle required for operation, allowing the consumer to choose the particular circuit to be disabled. For example, the invention can be placed in circuit with the fuel supply system, the ignition system, or any other required electrical operation circuit.

Figure 4:
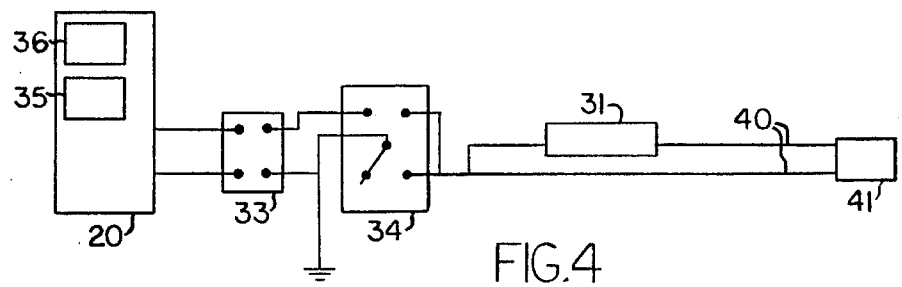
FIG. 4 is a schematic of the disabling mechanism component of the invention.

The receiver means 20 can be any known type of receiver capable of receiving radio signals transmitted from remote locations and capable of initiating an electrical impulse in response to said signal. For example, a receiver means 20 of a type commonly used in cellular or portable telephones or pagers is well adapted for this use. In response to a transmitted signal from the remote transmitter means 10, the receiver means 20 activates the disabling mechanism means 30 to interrupt the electrical circuit and thereby disable the vehicle. The disabling mechanism means 30 comprises a destructible component 50 which becomes damaged and inoperable, to the extent that it must be replaced, when the disabling mechanism means 30 is activated and the electrical circuit is interrupted. The disabling mechanism means 30 and the receiver means 20 are preferably contained in a single housing 32, shown in FIG. 2, with only the external leads 40 exposed. Because the destructible component 50 is rendered inoperable and must be replaced before the circuit can be restored, a thief cannot enable the vehicle after it has been disabled without replacing the destructible component 50. Where the destructible component 50, as in the preferred embodiment shown in FIG. 4, is a fuse 31, it is preferred that the type of fuse 41 used in the disabling mechanism means 30, either blade or bulb, be of the type not found in the vehicle itself. Thus, if the vehicle has a blade type fuses, then fuse 31 in the system should be a bulb type, and if the vehicle has bulb type fuses, then fuse 31 should be a blade type, such that the thief cannot replace the blown fuse 31 with a fuse from a non-essential vehicle circuit.

An example of a disabling mechanism means 30 is shown in FIG. 4. Here the receiver means 20 is connected in circuit with a 1.5 V relay or transistor 33, which is in turn connected in circuit to a 12 V relay 34, connected to a ground and to the fuse 31 and external leads 40. When a proper activation signal is received by the receiver means 20, a current is sent through relay 33 to relay 34, which in turn grounds out the electrical circuit and blows fuse 31, interrupting the vehicle operative electrical circuit to which the vehicle disabling system has been connected by connector fitting 41. If the disabling mechanism means 30 is connected to the electrical circuit controlling the fuel supply, the fuel will no longer be supplied to the engine and the car will lose power in a manner similar to running out of gas. Steering and braking will not be affected, meaning that the thief will be able to control the vehicle as it stops.

The housing 32 containing the receiver 20 and disabling mechanism means 30 can be mounted in the vicinity of the fuse box, whether in the driver's area or under the hood, but is preferably mounted at a location distant from the fuse box by utilizing long external leads 40. In this manner, a thief examining the fuse box after the vehicle has been disabled to determine if a fuse needs replacement will find no blown fuse, the blown fuse 31 being in the housing 30, and since the housing 30 is not readily discernable, will not be able to readily start the vehicle nor be led to spend significant time looking for the cause of the disabling, opting instead to abandon the vehicle before being apprehended. In another preferred embodiment, a reset mechanism 35 of any generally known type is further incorporated into either the receiver means 20 or the disabling mechanism means 30, such that the reset means 35 must be actuated after replacement of the blown fuse 31 or else the new fuse 31 will likewise be blown. A timing means 36 may further be incorporated into the system, whereby the disabling mechanism means 30 will be reactivated, unless the timing means 36 is deactivated or reset, and the replacement fuse 31 will be blown after a preset time period instead of being blown instantaneously upon replacement.

It is understood that substitutions and equivalents may be obvious to those skilled in the art to the examples given above, which are presented by way of illustration only. The full scope and definition of the invention therefore is to be as set forth in the following claims.

I claim:

1. A remote signal responsive vehicle disabling system for disabling a vehicle in response to a remotely transmitted activation signal, said vehicle having one or more necessary operative electrical circuits and one or more fuse receptacles electrically connected in said one or more electrical circuits, said system comprising:

(A) separate transmitter means to transmit an activation signal comprising an activation number and a password;

(B) activation signal receiver means mountable within the vehicle to receive said activation signal and activate vehicle disabling mechanism means to disable the vehicle in response to said activation signal by interrupting said one or more operative electrical circuits of said vehicle, said disabling mechanism means comprising a destructible component which is destroyed upon activation;

(C) external leads for connecting said disabling mechanism means to said one or more fuse receptacles of said one or more operative electrical circuits of said vehicle, whereby said one or more operative electrical circuits is routed through said disabling mechanism means and operates uninterrupted until said disabling mechanism means is activated to destroy said destructible component, thereby interrupting said one or more operative electrical circuits; and (D) a reset mechanism which must be reset to allow operation of said one or more operative electrical circuits after said one or more operative electrical circuits has been interrupted and said destructive component has been replaced.

2. The system of claim 1, where said destructible component is a fuse.

3. The system of claim 1, where said external leads further comprise a connector fitting to connect said leads to said fuse receptacle.

4. The system of claim 3, where said connector fitting is a blade type fitting.

5. The system of claim 3, where said connector fitting is a bulb type fitting.

6. The system of claim 1, further comprising a timing mechanism connected to said disabling mechanism means whereby said disabling mechanism means is repeatedly activated over successive periods of time.

7. The system of claim 2, where said disabling mechanism means further comprises in circuit a 1.5 V relay and a 12 V relay.

8. The system of claim 2, where said disabling mechanism means further comprises in circuit a transistor and a 12 V relay.

9. A remote signal responsive vehicle disabling system for disabling a vehicle in response to a remotely transmitted activation signal, said vehicle having one or more necessary operative electrical circuits and one or more fuse receptacles electrically connected in said one or more electrical circuits, said system comprising:

(A) separate transmitter means to transmit an activation signal comprising an activation number and a password;

(B) activation signal receiver means mountable within the vehicle to receive said activation signal and activate vehicle disabling mechanism means to disable the vehicle in response to said activation signal by interrupting said one or more operative electrical circuits of said vehicle, said disabling mechanism means comprising a destructible component which is destroyed upon activation;

(C) external leads for connecting said disabling mechanism means to said one or more fuse receptacles of said one or more operative electrical circuits of said vehicle, whereby said one or more operative electrical circuits is routed through said disabling mechanism means and operates uninterrupted until said disabling mechanism means is activated to destroy said destructible component, thereby interrupting said one or more operative electrical circuits; and (D) a timing mechanism connected to said disabling mechanism means whereby the disabling mechanism means is repeatedly activated over successive periods of time.

10. The system of claim 9, where said destructible component is a fuse.

11. The system of claim 9, where said external leads further comprise a connector fitting to connect said leads to said fuse receptacle.

12. The system of claim 11, where said connector fitting is a blade type fitting.

13. The system of claim 11, where said connector fitting is a bulb type fitting.

14. The system of claim 10, where said disabling mechanism means further comprises in circuit a 1.5 V relay and a 12 V relay.

15. The system of claim 10, where said disabling mechanism means further comprises in circuit a transistor and a 12 V relay.

* * * * *

UNITED STATES PATENT AND TRADEMARK OFFICE
CERTIFICATE OF CORRECTION

PATENT NO. : 5,533,589
DATED : July 9, 1996
INVENTOR(S) : Critzer

It is certified that error appears in the above-indentified patent and that said Letters Patent is hereby corrected as shown below:

Column 3, line 26, the term "FIG.2" should correctly read -- FIG.3 --.
Column 3, line 27, the term "FIG.3" should correctly read -- FIG.2 --.

Signed and Sealed this

Fourteenth Day of January, 1997

Attest:

BRUCE LEHMAN

*Attesting Officer*            *Commissioner of Patents and Trademarks*